United States Patent Office 3,249,492
Patented May 3, 1966

3,249,492
CONTROLLING TERMITES WITH A FUNGUS
Anders E. Lund, Pitcairn, Pa., assignor to Koppers Company, Inc., a corporation of Delaware
No Drawing. Filed Jan. 29, 1963, Ser. No. 254,589
3 Claims. (Cl. 167—22)

This invention relates generally to termite control and, more particularly, to the control of termites by the use of fungi.

It is well known that fungi may develop profusely throughout the burrows of termites. The relationship between fungi and termites has not been completely established, however. One theory holds that the fungus alters the structure of the wood and thus enables it to be attacked by the termites. Another theory is that the termites cultivate the fungus in order to obtain protein for growth. A still further theory is that the conditions which are conducive to the growth of fungi are also conducive to the growth of termites and their close association is merely accidental.

It has been found that, quite unexpectedly, the wood decaying fungus Lentinus lepideus is antagonistic and extremely lethal to termites.

The fungus Lentinus lepideus is widely distributed. It has the remarkable characteristic of tolerance to comparatively high concentrations of creosote. (It can attack wood which has been impregnated with solutions containing 4% creosote.) Accordingly, the fungus is associated with the decaying of railroad ties and telegraph poles. The fungus is also extremely resistant to heat. It has been reported that an hour's exposure at a temperature of 329° F. is required to sterilize blocks of wood infected with the fungus Lentinus lepideus.

The fungus Lentinus lepideus particularly attacks coniferous lumber. The rot presents the appearance of a brown cubical surface and mycelium tinged with purplish brown. Morphologically, clamps are present, often of medallion type. The rot freely penetrates the cell walls; the holes are large—average 5 to 8 microns across; cracking and straining of the walls may occur. The texture is woolly, often tufted with rounded lumps of cylindrical outgrowth. In a culture, the color is white, then light brown or dark purplish-brown tints occur. The young hyphae are colorless, from 1½ to 4 microns wide; the older cultures are either fine and colorless or thick-walled and yellowish-brown. The fungus has an odor somewhat like Peru balsam.

In accordance with this invention using conventional biochemical procedures, the fungus may be prepared as a powder, liquid, or as an extract prepared therefrom. For example, the mycelial mat may be filtered from the culture, the mat then is dried and powdered. The culture also may be used as a spray since it contains a metabolite which is toxic to termites. As is conventional in repellents and the like, the active ingredients may comprise only a small portion of the final composition. The remainder may be an appropriate vehicle, usually inert ingredients such as clay, lime, talc, and the like. The vehicle may also be water or a suitable inert solvent to form either a true solution or a suspension, preferably employing a compatible emulsifying agent. Thus, the fungus may be applied as a dust, a spray, or an aerosol.

In practical application, the termite burrows may be sprayed with a culture of the fungus or the underground area may be stacked with wood which has been inoculated with the decay.

Advantageously, the soil under the slab which will constitute the floor of the building structure of the basement may be sprayed or dusted with the fungus. The metabolite produced by the fungus poisons the soil to provide the lethal action to the termites. Since the slab will operate effectively as a vapor barrier, the metabolite life is indefinite. It is postulated that it would provide protection for at least five years.

The invention will be illustrated further by the following examples:

Example I

Petri dishes containing agar were inoculated with the wood destroying fungus, Lentinus lepideus. The plates were allowed to remain undisturbed until fungal growth covered the agar. Ten termites (Reticulitermes flavipes) were added to each of the dishes. The dishes were then stored over water in a covered desiccator at 80° F. Two dishes were prepared in this manner and inoculated with the fungus, Lentinus lepideus. Two other dishes were prepared in this manner and inoculated with the fungus, Poria incrassata. Two dishes as a control were also handled in this manner. At the end of three days, all termites exposed to the fungus Lentinus lepideus were dead. At the end of this time, no termites had died in the control dishes. At the end of eight days, however, 20% of the termites had died in one control dish and 10% in the other control dish. At the end of eleven days, 20% of the termites had died in each of the control dishes; at the end of fourteen days, 90% of the termites in one control dish were dead, and 80% in the other control dish were dead. At the end of eighteen days, all of the termites in the control dishes were dead. In contrast, in one dish containing the fungus, Poria incrassata, no termites had died at the end of eighteen days; in the other dish 20% of the termites had died between the 14th and 18th day. At the end of a twenty-seven-day period, 40% of the termites were dead in each dish; at the end of thirty-five days, 80% of the termites were dead in one dish, and 70% were dead in the other dish. At the end of forty-three days, 100% of the termites were dead in the one dish and 70% were dead in the other dish.

Example II

Cubes of wood having a size ¾ of an inch long were sterilized. Some of the cubes were inoculated with the fungus, Lentinus lepideus. Ten cubes were added to a jar. One jar, however, contained no food at all. At the end of thirty days, the condition of the termites in each jar was determined. In the jar with no food, 96% of the termites had died; in the jar containing the sterilized wood, 30 to 40% of the termites had died and 112 cubic millimeters of the wood had been destroyed by the termites. In the jar containing wood decayed by the fungus Lentinus lepideus, all termites had died.

Example III

Petri dishes containing malt agar were inoculated with fungi. Six were inoculated with the fungus, Lentinus lepideus; six were inoculated with the fungus, Poria incrassata; and six were allowed to remain sterile. Ten termites (Reticulitermes flavipes) were added to each dish. Each group was placed over water in a covered desiccator. Two of the desiccators were stored in a room controlled at 27° C. The third was placed in a room maintained at 23° C. An inspection was made of the dishes every two days. Within two days, all termites in the dishes containing the fungus Lentinus lepideus were dead. In the control dishes, the termites lived for twenty days in one dish at 27° C. and for nineteen days in the other dish. The termites lived for fifty-eight days in the dishes at 23° C.

In the dish containing the fungus, Poria incrassata, the termites lived for forty-four days in one dish and sixty-two days in the other dish. The termites in the dishes at 23° C. lived for sixty-two days.

Example IV

Sterilized petri dishes containing malt agar were inoculated with wood-destroying fungi, one fungus per dish. After the agar surface was covered with a mycelium mat, ten termites were added to each dish. Control dishes contained only the malt agar. The dishes were placed over distilled water in a covered desiccator maintained at about 74° F. Every two days, the dishes were removed and examined. The average termite life was as follows:

| | Days |
|---|---|
| Control | 20 |
| Lentinus lepideus | 1 |
| Lentinus tigrinus | 25 |

Example V

Petri dishes containing agar were inoculated with the fungus, Lentinus lepideus and other dishes with the fungus, Poria incrassata. A control dish was not inoculated. After the fungi had developed well on the agar, ten termites were placed in each dish. The dishes were examined every two days for the number of penetrations through agar and the horizontal tunnels constructed by the termites in the agar, the length of the tunnels constructed and the termite life span. The results are as follows:

| Fungus | Vertical Penetrations Through Agar, Aver. No. | Horizontal Tunnels in Agar | | Termite Life Span Days, Aver. |
|---|---|---|---|---|
| | | Aver. No. | Aver. Length, mm. | |
| Lentinus lepideus | 0.3 | 0 | 0 | 2— |
| Poria incrassata | 2.0 | 1.0 | 9.3 | 56 |
| Control | 1.6 | 0.6 | 3.7 | 32.3 |

Example VI

A petri dish containing agar was inoculated with the fungus Lentinus lepideus. After a mycelial mat had well covered the agar, the fungus was killed by heat sterilization at 220° F. for four hours. Thereafter, the culture was extracted with water.

Ten petri dishes were prepared using a conventional malt agar. At a corner of five of the dishes was added some of the foregoing extract (diluted so that it constituted 0.1% by weight of the addition liquid). The remaining five dishes were kept as controls. To each dish was added ten termites. Within the period of one day, all termites in the dishes to which had been added a small amount of the extract from the fungus were dead, while in contrast, all termites in the control dishes (which contained only agar) appeared healthy.

Example VII

A pine woodplank was cut into cubes having sides ¾ of an inch long. Six of these cubes were inoculated and thereafter partially decayed by the fungus Lentinus lepideus. Six were also maintained as sound wood. Three of the six cubes partially decayed by the fungus were subjected to extraction with water, the extract was bottled, and these cubes were destroyed. The other three cubes which were partially decayed by the fungus were then air dried and heated to a temperature of 355° F. for an hour. Six months later, tests were made by placing one cube of wood in a jar and subjecting it to the action of ten termites. In the jars which held a cube of wood partially decayed by the fungus, the termites attacked the wood but died within a day. The tests were repeated using cubes of sound wood which had been dipped in the aqueous extract of the fungus and again the termites died within a day. The termites which were placed in a jar with the cubes of sound wood attacked the sound wood and were still healthy at the end of two weeks.

The foregoing illustrates that the storage life of the toxic material is of indefinite length. While the foregoing example utilizes water as an extractant, it is to be recognized, of course, that other compatible extractants can be used, such as for example, methanol, ethanol, alcohol-benzene, acetone, ether, and the like.

The foregoing thus has presented a means for the biological control of termites. By the use of an attractant, the termites can be attracted to wood containing the fungus, Lentinus lepideus, and thereby to their demise. While the genus Lentinus is widespread through nature and contains numerous species, it appears only that the one species, Lentinus lepideus, is toxic to termites.

I claim:

1. A method of controlling termites and preventing their infestation of building structures which comprises poisoning the ground surrounding the building structure with the fungus Lentinus lepideus.

2. A method of killing termites which consists of applying to said termites a composition comprised essentially of the fungus Lentinus lepideus as its active ingredient.

3. A method of combating termite infestation of a building structure which comprises exposing the termites to the fungus Lentinus lepideus.

References Cited by the Examiner

Chem. and Eng. News, Dec. 22, 1958, vol. 36, No. 51, p. 15.

Hanna, Handbook of Agricultural Chemicals, 2nd Ed., 1958, pp. 410–412.

Hilgardia, vol. 23, No. 1, May 1954, pp. 1–23 (pp. 1–3 relied on).

Pfizer, Handbook of Microbial Metabolites, 1961, pp. 285–286.

Science, vol. 129, No. 3348, Feb. 27, 1959, pp. 537–544.

Washington Daily News, April 7, 1959, page 3.

JULIAN S. LEVITT, *Primary Examiner.*

S. J. FRIEDMAN, *Assistant Examiner.*